United States Patent
Tang et al.

(10) Patent No.: US 8,238,059 B1
(45) Date of Patent: Aug. 7, 2012

(54) PMR WRITE HEAD WITH NARROW GAP FOR MINIMAL INTERNAL FLUX LOSS

(75) Inventors: Yuhui Tang, Milpitas, CA (US); Lijie Guan, Milpitas, CA (US); Tai Min, San Jose, CA (US); Suping Song, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/066,095

(22) Filed: Apr. 6, 2011

(51) Int. Cl.
*G11B 5/127* (2006.01)
(52) U.S. Cl. .................................. 360/125.03
(58) Field of Classification Search ............ 360/125.03, 360/125.3, 125.09, 125.04, 123.1, 125.17, 360/125.12, 125.16, 125.15, 125.06, 125.26, 360/125.19, 125.13, 125.31, 125.21, 125.24, 360/125.27, 125.02
See application file for complete search history.

(56) References Cited

U.S. PATENT DOCUMENTS

| | | | |
|---|---|---|---|
| 7,102,854 B2 * | 9/2006 | Wang et al. ................ | 360/125.5 |
| 7,149,045 B1 * | 12/2006 | Mallary et al. ................ | 360/55 |
| 7,461,933 B2 * | 12/2008 | Deily et al. ................ | 347/102 |
| 7,486,475 B2 * | 2/2009 | Biskeborn ................ | 360/121 |
| 7,679,862 B2 * | 3/2010 | Nakamoto et al. ....... | 360/125.32 |
| 7,697,244 B2 | 4/2010 | Lin | |
| 7,751,156 B2 * | 7/2010 | Mauri et al. ................ | 360/324.2 |
| 7,791,844 B2 | 9/2010 | Carey et al. | |
| 7,830,641 B2 * | 11/2010 | Lin ................ | 360/324.2 |
| 2007/0230068 A1 * | 10/2007 | Gill ................ | 360/324.2 |
| 2008/0080101 A1 * | 4/2008 | Mauri et al. ................ | 360/324.2 |
| 2008/0204945 A1 * | 8/2008 | Freitag et al. ................ | 360/324.11 |
| 2008/0259507 A1 * | 10/2008 | Lin ................ | 360/324.1 |
| 2009/0168267 A1 * | 7/2009 | Lin ................ | 360/324.2 |
| 2009/0323228 A1 * | 12/2009 | Carey et al. ................ | 360/319 |
| 2010/0221581 A1 | 9/2010 | Lee et al. | |

OTHER PUBLICATIONS

"A soft magnetic underlayer with negative uniaxial magnetocrystalline anisotropy for suppression of spike noise and wide adjacent track erasure in perpendicular recording media," by Atsushi Hashimoto et al., Journal of Applied Physics 99, 08Q907 (2006), pp. 1-3.

"A novel crystalline soft magnetic intermediate layer for perpendicular recording media," by Soyoung Park et al., Journal of Applied Physics 105, 07B723(2009), pp. 1-3.

"Magnetocrystalline Anisotropy for Alpha'-Fe-C and Alpha'-Fe-N Films," by Migaku Takahashi et al., IEEE Transactions on Magnetics, vol. 37, No. 4, Jul. 2001, pp. 2179-2181.

(Continued)

*Primary Examiner* — Allen Cao
(74) *Attorney, Agent, or Firm* — Saile Ackerman LLC; Stephen B. Ackerman

(57) ABSTRACT

A PMR writer is disclosed wherein one or more of a trailing shield, leading shield, and side shields are composites with a first section made of an anisotropic (-Ku) magnetic layer adjoining a gap layer and a second section comprised of an isotropic soft magnetic layer formed on a side of the first section that faces away from the main pole. There may be a non-magnetic Ru layer between each first and second section to prevent interlayer coupling. Each first section has a hard axis in a direction toward the main pole and is comprised of hcp-CoIr, dhcp-CoFe, a'-Fe—C, or NiAs-type $Mn_{50}Sb_{50}$ with a thickness from 50 to 500 nm. As a result, flux leakage from the main pole to a shield structure is reduced and area density is increased. A method for fabricating a composite shield structure is also provided.

24 Claims, 6 Drawing Sheets

OTHER PUBLICATIONS

"Co-7% Ir Soft Magnetic Intermediate Layer for Perpendicular Media," by Soyoung Park et al., IEEE Transactions on Magnetics, vol. 46, No. 6, Jun. 2010, pp. 2278-2281.

"Influence of 5d transition elements on the magnetocrystalline anisotropy of hcp-Co," Letter to the Editor, Journal of Phys.: Condens. Matter 11 (1999) L485-L490, Printed in the UK, PII: S0953-8984(99)07875-3, pp. L485-L490, Found: http://iopscience.iop.org/0953-8984/11/43/103, on Apr. 21, 2011.

"Temperature Dependence of the Magnetocrystalline Anisotropy in Dilute Cobalt-Iron Alloys," by Minoru Takahashi et al., Journal of the Physical Society of Japan, vol. 48, No. 4, Apr. 1980, pp. 1390-1392.

"Crystal Magnetic Anisotropy and Magnetization of MnSb," by Toshimichi Okita et al., Journal of the Physical Society of Japan, vol. 25, No. 1, Jul. 1968, pp. 120-124.

\* cited by examiner

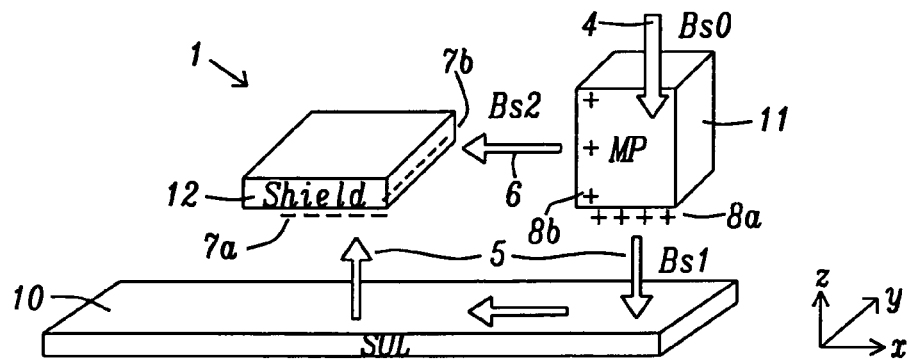
FIG. 1 – Prior Art
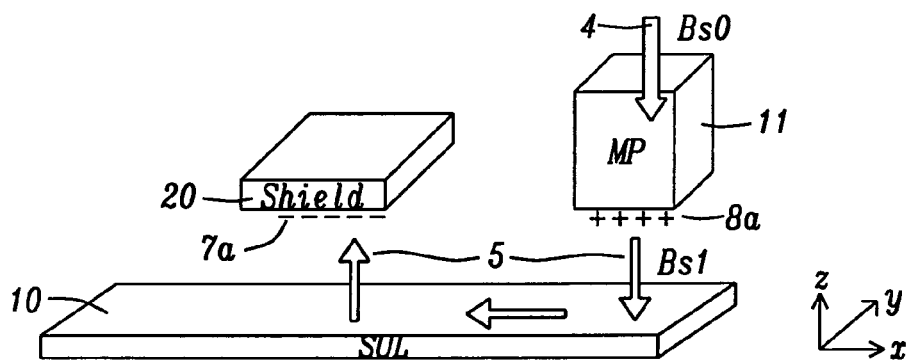
FIG. 2
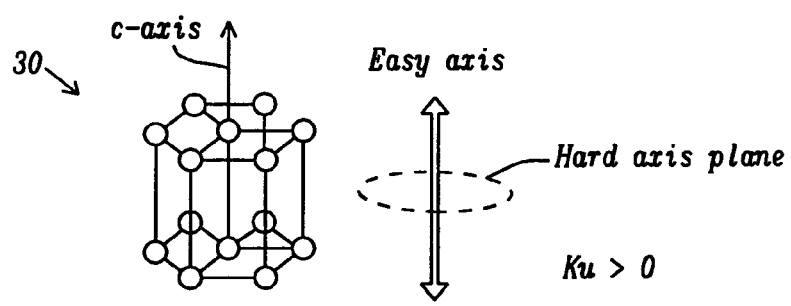
FIG. 3a

PMR WRITE HEAD WITH NARROW GAP FOR MINIMAL INTERNAL FLUX LOSS

FIELD OF THE INVENTION

The invention relates to a magnetic shield material having a hard axis aligned towards the main pole and a magnetic softness in a 2D plane orthogonal to the hard axis in order to minimize flux loss between the main pole and adjacent shields, and to avoid a magnetic charge at the ABS of magnetic shields in a non-write condition.

BACKGROUND OF THE INVENTION

In today's perpendicular magnetic recording (PMR) technology, an all wrapped around (AWA) shield writer is widely used by the major hard disk drive (HDD) manufacturers. The function of a trailing shield in an AWA structure is to improve the magnetic field gradient along a down track direction which is a key requirement for high bits per inch (BPI). Meanwhile, side shields and a leading shield serve to define a narrower writer bubble which is important for realizing higher tracks per inch (TPI). In order to achieve higher area density (i.e. higher BPI and TPI) in advanced writer designs, the gap between the main pole and all shields, including the write gap adjoining the trailing shield, side gaps adjacent to the side shields, and lead gap next to the leading shield must be as narrow as possible. However, the material used for conventional AWA shields is a soft magnetic material without preferred anisotropy. Therefore, narrowing the gap between a shield and main pole will only lead to an unwanted flux path from the main pole to the shield which in turn reduces the writability (magnetic field) of the writer on magnetic recording media. This dilemma is considered one of the most significant challenges to improving current writer designs and performance.

Referring to FIG. 1, internal flux loss is depicted in a conventional PMR writer 1 comprising a main pole 11 and shield 12 that can represent a trailing shield, side shield, or leading shield depending on the direction of movement of the writer over magnetic medium 10 during a write process. Magnetic charges 7a, 8a of opposite sign are shown on an air bearing surface (ABS) side of the shield 12, and main pole 11, respectively, and are responsible during a write process for the preferred direction 5 of flux Bs1 from the main pole to the magnetic medium, and returning from the magnetic medium to the shield. Magnetic flux Bs0 is provided to the main pole from coils (not shown). As the gap (distance) between main pole and shield becomes smaller, flux loss Bs2 in a direction 6 from main pole to shield becomes more severe due to magnetic charges 7b, 8b on opposing sides of the shield, and main pole, respectively. Consequently, the write field Bs1 on the magnetic recording medium will be degraded. With the constraint of write field amplitude on the magnetic medium 10, further reduction of the gap between main pole and shields is not allowed which limits achieving a higher recording area density. Thus, an improved shield design is needed to minimize flux loss Bs2 and maximize write field Bs1.

A search of the prior art revealed the following references. U.S. Pat. No. 7,791,844 discloses magnetic shields having magnetic anisotropy with easy axes of magnetization that are oriented substantially perpendicular to the track direction. The magnetic anisotropy is created by one or more surface texture treatments such as ion milling and prevents the NiFe shields from becoming saturated in a direction perpendicular to the magnetic recording medium.

U.S. Pat. No. 7,697,244 teaches that a CoFe shield may be stabilized to have a single domain status when no fields are applied. The uniaxial anisotropy field $H_K$ is about 7.5 Oe which corresponds to a permeability of about 1400 and means a large amount of magnetic flux from the magnetic medium can penetrate into the shield.

U.S. Patent Application 2010/0221581 describes a method of fabricating a recording medium wherein the c-axis is aligned along the easy axis.

A. Hashimoto et al. describe the use of a negative Ku magnetic material in "A soft magnetic underlayer with negative uniaxial magnetocrystalline anisotropy for suppression of spike noise and wide adjacent track erasure in perpendicular magnetic recording media", Journal of Applied Physics, 99, 08Q907 (2006).

A composite grain of easy plane material (CoIr with negative Ku) and perpendicular anisotropy material (CoPt with positive Ku) are used in a magnetic medium to improve the head field gradient and amplitude as described by Park et al in "A novel crystalline soft magnetic intermediate layer for perpendicular recording media", Journal of Applied Physics, 105, 07B723 (2009), and in "Co-7% Ir Soft Magnetic Intermediate Layer for Perpendicular Media", IEEE Transactions on Magnetics, Vol. 46, No. 6, June 2010.

Takahashi et al. discuss structural and magnetic analyses of a'-Fe—C films in "Magnetocrystalline Anisotropy for a'-Fe—C and a'-Fe—N Films", IEEE Transactions on Magnetics, Vol. 37, No. 4, July 2001.

SUMMARY OF THE INVENTION

One objective of the present invention is to provide a shield composition and design where the gap between one or more shields and a main pole is narrowed to improve the field gradient with a minimum amount of internal flux loss as required for high area density PMR writers.

Another objective of the present invention is to provide a method of forming a PMR writer with a reduced gap distance according to the first objective.

According to the embodiments of the present invention, the first objective is achieved with a shield that is made of a magnetic material with a negative crystalline anisotropy energy constant (-Ku) at room temperature. The shield layer is deposited on a seed layer such as Ru that aligns the c-axis (hard axis) of the hexagonal crystalline structure toward the main pole. The c-axis forms an angle between 0 and 90 degrees with respect to the ABS, and preferably between 20 degrees and 45 degrees with respect to the ABS. Thus, magnetization of the shield can only be induced in a direction toward the main pole with a strong magnetic field. Furthermore, the shield is totally soft in a 2D plane orthogonal to the hard axis which means the magnetization of the shield can be easily induced in any direction orthogonal to the hard axis with a weak magnetic field. As a result, two key requirements of a shield are satisfied by the embodiments described herein and they are (1) providing a magnetic charge at the ABS side of the shield during a write process; and (2) an absence of magnetic charge at the ABS side of the shield in a relaxed state (non-write condition). Furthermore, magnetic charges are minimized on a side of the shield facing the main pole such that flux loss from the main pole to the shield is insignificant.

According to a first embodiment, the shield structure may comprise one or more of a trailing shield, leading shield, and side shields. In one aspect, the shield structure may be an AWA design that completely surrounds the main pole. In a second embodiment, the novel shield design features a composite shield structure wherein a first section made of an anisotropic (-Ku) magnetic material adjoins the gap layer on one or more sides of the main pole and is closer to the main pole than a second section of the shield structure made of a soft isotropic magnetic material and formed on a side of the first section that faces away from the main pole. The first section is comprised of a magnetic material with a negative crystalline anisotropy constant (-Ku) and has a hard axis aligned toward the main pole. In an embodiment wherein the anisotropic (-Ku) magnetic layer adjoins a write gap, the width of the anisotropic (-Ku) shield layer is preferably greater than that of the adjoining write gap from an ABS view to prevent flux loss from the main pole in a direction toward the shield. When the shield structure is a composite comprising a second (isotropic magnetic) section and the first (anisotropic magnetic) section, there is preferably a non-magnetic metal spacer formed between the first and second sections to prevent interlayer exchange coupling between the -Ku magnetic material and the conventional soft magnetic layer. The non-magnetic spacer may be comprised of Ru with a thickness of 20 to 50 Angstroms.

The magnetic material with a negative crystalline anisotropy constant and having a hard axis aligned toward the main pole may be comprised of hcp-CoIr wherein the Ir content is 10 to 40 atomic %, and preferably between 17 and 22 atomic %, dhcp-CoFe, a'-Fe—C, or NiAs-type $Mn_{50}Sb_{50}$. The thickness of the anisotropic (-Ku) shield layer is from 50 to 500 nm.

A method is provided for forming a PMR writer with a main pole surrounded by a gap layer, and a shield structure that includes a composite trailing shield made of an anisotropic (-Ku) magnetic layer and an isotropic soft magnetic layer. According to one embodiment, a leading shield and a side shield layer made of an isotropic soft magnetic material are sequentially formed on a substrate. An opening with sidewalls is formed in the side shield to expose a portion of the leading shield top surface. Side gap and leading gap layers are conformally deposited in the opening followed by plating the main pole to fill the opening. After a CMP process to planarize the main pole, a taper may be formed on the main pole trailing side. Then a write gap, seed layer, and an anisotropic (-Ku) layer are sequentially deposited on the side gap and a portion of the main pole trailing side including the trailing edge. The anisotropic magnetic layer forms a first section of trailing shield. Finally, a non-magnetic spacer and conventional soft magnetic material (second trailing shield section) are sequentially deposited on the first trailing shield section. The c-axis for the first trailing shield section forms an angle β between 0 and 60 degrees, and preferably 20 to 45 degrees with respect to the ABS.

Another method is provided for forming composite side shields which have a first section made of an anisotropic (-Ku) magnetic material contacting a side gap layer, and a second section of isotropic magnetic material formed on a side of the first section that faces away from the main pole. The c-axis for each first section of side shield is toward the main pole and forms an angle α between 0 and 60 degrees, and preferably 20 to 45 degrees with respect to the ABS.

A method is also provided for fabricating a composite leading shield wherein a first leading shield section made of an anisotropic (-Ku) material adjoins a bottom surface of a lead gap, and a second leading shield section comprised of an isotropic soft magnetic layer is formed on a side of the first leading shield section that faces away from the main pole leading edge.

BRIEF DESCRIPTION OF THE DRAWINGS

FIG. 1 is an oblique view of a prior art PMR writer where there is considerable flux loss from the main pole in a direction toward an adjacent shield.

FIG. 2 is an oblique view of a PMR writer wherein a shield is made with an anisotropic magnetic material to minimize flux leakage from the main pole to an adjacent shield.

FIG. 3a depicts a hexagonal crystal structure with crystalline anisotropy energy constant (Ku)>0 such that its c-axis is aligned with an easy axis direction.

DETAILED DESCRIPTION OF THE INVENTION

Figure 3B:
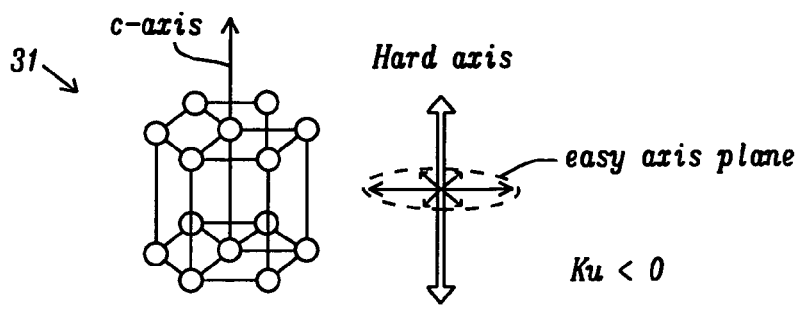
FIG. 3b depicts a hexagonal crystal structure with crystalline anisotropy energy constant (Ku)<0 such that its c-axis is aligned with a hard axis direction.

The present invention is a composite shield structure in a PMR writer which takes advantage of the discovery that an anisotropic (-Ku) magnetic material may be used as a shield layer to minimize flux loss from an adjacent main pole in a direction parallel to the ABS and thereby maximize the flux field at the main pole interface with the ABS. Although the exemplary embodiment depicts a trapezoidal shaped main pole at the ABS, the present invention also encompasses other main pole shapes. Furthermore, the main pole may not be tapered, or may have one or both of a tapered trailing edge and a tapered leading edge. Width in the context of shield structures and layers defined herein refers to a distance in a cross-track direction, and thickness or depth relates to a distance in a down-track direction. The gap layer as illustrated herein may not have a uniform thickness and the write gap portion between the main pole and trailing shield is typically thinner than side gaps or lead gap portions.

Referring to FIG. 2, a shield 20 made of anisotropic magnetic material is shown adjacent to a main pole 11. Magnetic charges 7a, 8a at the ABS of shield 20, and main pole 11, respectively, are formed above magnetic medium 10. In this case, a single shield is depicted and may be a trailing shield, leading shield, or side shield depending on the direction of main pole movement over the magnetic medium. In a PMR writer, there may be a shield 20 formed on all sides of main pole 11 in the (x, y) plane. Note that in the absence of a strong magnetic field, there are essentially no magnetic charges formed on a side of the shield facing the main pole which prevents a portion of magnetic field Bs0 from being diverted to a shield. Thus, the magnetic field Bs1 at the ABS is maximized compared with the condition previously shown in FIG. 1 and the gap between main pole and shield may be reduced with a minimum amount of flux loss to enable a significant gain in BPI and TPI for advanced writer designs.

Referring to FIG. 3a, most single crystal magnetic materials have a magnetic energy which is anisotropic due to the crystalline structure. Normally, the anisotropy energy constant hereafter referred to as Ku is positive which means the magnetic energy is lowest with a magnetization direction along the c-axis as shown for crystal 30. In the absence of an external field, magnetization is aligned with the c-axis which is defined as the easy axis, and the plane orthogonal to the c-axis is defined as the hard axis plane.

When the crystalline anisotropy energy is negative (Ku<0) as illustrated for crystal 31 in FIG. 3b, the magnetic energy in the absence of a magnetic field is highest along the c-axis which represents the hard axis. Thus, the plane orthogonal to the c-axis is the easy axis plane. As a result, the magnetization of a hexagonal crystal magnetic material with a negative Ku value can be rotated to the direction of the c-axis only with a large magnetic field.

Figure 4:
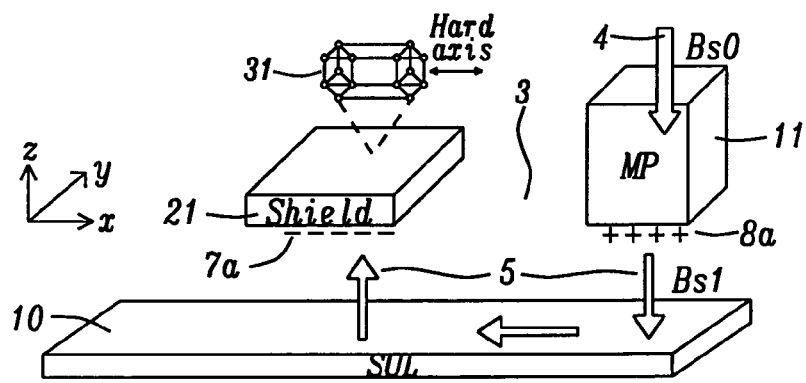
FIG. 4 is an oblique view of a PMR writer according to an embodiment of the present invention wherein a shield is made of an anisotropic (-Ku) magnetic material having a hard axis aligned in a direction toward the main pole to minimize internal flux loss.

Referring to FIG. 4, a first embodiment of the present invention is shown wherein a shield 21 made of an anisotropic (-Ku) magnetic material with a plurality of crystals 31 and a hard axis in the x-axis direction is advantageously used to prevent flux leakage from a main pole 11 formed in a x-axis direction from the shield 21 and separated therefrom by gap 3. By depositing the shield layer on an appropriate seed layer (not shown), the c-axis of each hexagon crystal 31 is pointing toward the main pole. Magnetic charges 7a are still generated at the ABS of the shield 21 during a write process to facilitate the desired flow 5 of flux from the main pole 11 into the magnetic medium 10, and then into the shield 21. The magnetization direction of the shield 21 may be induced orthogonal to the hard axis by a weak magnetic field which has a magnitude less than about 20 Oe.

Figure 5A:
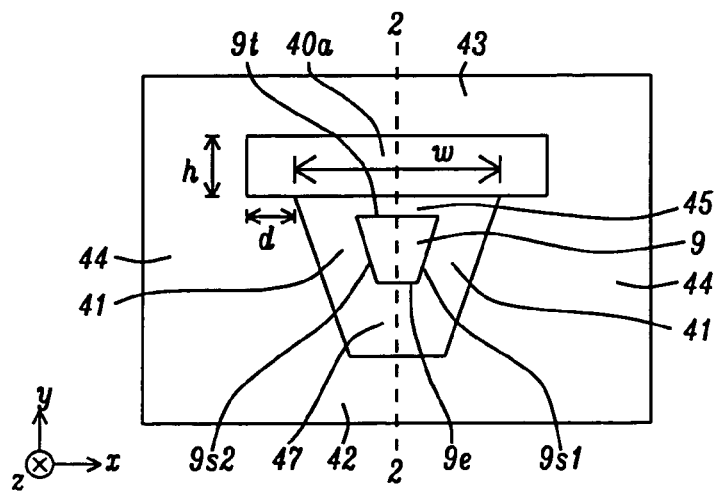
FIG. 5a is an ABS view of an anisotropic (-Ku) magnetic shield layer formed between a write gap and a second section of trailing shield according to a second embodiment of the present invention.

Referring to FIG. 5a, a second embodiment of the present invention is shown from an ABS view and includes a main pole 9 having a trapezoidal shape with a leading edge 9e that has a smaller width in a cross-track (x-axis) direction than the trailing edge 9t. Sloped sides 9s1, 9s2 of the main pole are adjoined by a side gap 41 made of a dielectric material. Main pole 9 may include a seed layer (not shown) along sides 9s1, 9s2 and along leading edge 9e that facilitates a deposition method wherein main pole material is plated in an opening bounded by side gaps 41 and lead gap 47. In the exemplary embodiment, the side gap has a uniform width in the x-axis direction and conforms to the shape of the sides 9s1, 9s2. There is also a write gap 45 having a width w that adjoins a top surface of each side gap 41 and interfaces with the trailing edge 9t of the write pole. The write gap may be comprised of the same dielectric material as in the side gap. A leading gap 47 interfaces with the leading edge 9e and adjoins a bottom surface of each side gap. Thus, there is a gap layer completely surrounding main pole 9 but the thickness along the plane 2-2 is typically less for the write gap 45 than for leading gap 47.

A key feature of this embodiment is an anisotropic (-Ku) magnetic layer 40a formed on a top surface of the write gap and having a thickness h of about 50 to 500 nm, and a width that is preferably greater than w. The anisotropic (-Ku) magnetic layer 40a is considered a first section of a composite shield and has a width (w+2d) which is advantageous in preventing flux loss from the main pole to a second trailing shield section 43 made of an isotropic magnetic material such as NiFe or CoNiFe. Although the first shield section 40a is shown having a rectangular shape which is typically easier to fabricate, the present invention encompasses other first shield section shapes such as a trapezoid where sides formed parallel to trailing edge 9t are of unequal width. As a result, the write gap thickness may be thinner than in prior art shield designs thereby enabling a higher BPI than previously realized. According to this embodiment, a portion of the bottom surface of anisotropic (-Ku) magnetic layer 40a contacts a top surface (not shown) of side shields 44 which is considered to be essentially coplanar with a top surface of write gap 45. Note that side shields 44 adjoin side gap 41 on either side of main pole 9, and leading shield 42 interfaces with leading gap 47 and side shields. A bottom surface of second trailing shield section 43 contacts side shield sections 44 at distances greater than (w+d) from the center plane 2-2. Side shields 44 and leading shield 42 may be formed of the same soft magnetic material as in second trailing shield section 43 and in this case form an all wrap around (AWA) shield structure with second trailing shield section 43.

Figure 11:
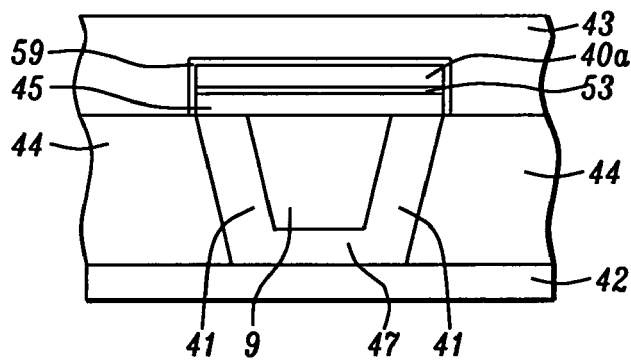
FIG. 11 is a cross-sectional view showing a non-magnetic layer separating first and second trailing shield sections according to an embodiment of the present invention.

According to one embodiment, first trailing shield section 40a may form an interface with second trailing shield section 43. However, in an alternative scheme as depicted in FIG. 11, a non-magnetic metal layer made of Ru or the like is formed between first trailing shield section 40a and second trailing shield section 43 to prevent interlayer exchange coupling between the first and second shield sections. Preferably, there is also a seed layer 53 made of Ru formed between first trailing shield section 40a and write gap 45. The seed layer is used to induce a hard axis alignment toward the main pole 9 for anisotropic (-Ku) magnetic crystals in the first trailing shield section.

Figure 5B:
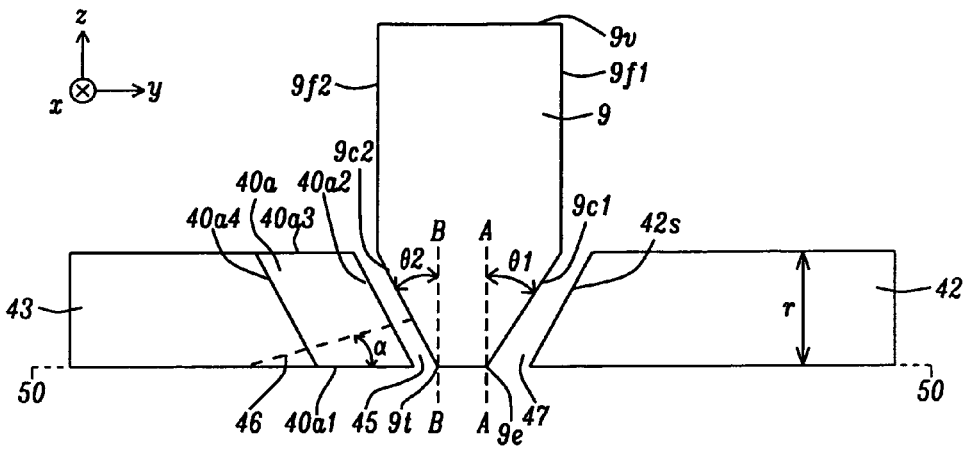
FIG. 5b is a cross-sectional view of the PMR writer shown in FIG. 5a wherein the c-axis angle for the anisotropic (-Ku) magnetic layer is shown with respect to the ABS.

Referring to FIG. 5b, a cross-sectional view is depicted of the aforementioned AWA shield structure along the plane 2-2 in FIG. 5a. In this embodiment, main pole 9 has both of a leading taper and trailing taper as indicated by tapered sides 9c1 and 9c2 which are not parallel with the z-axis but form angles θ1, ∂2, respectively, that are >0 degrees with respect to planes A-A and B-B which are aligned parallel to the z-axis. Tapered side 9c1 connects leading edge 9e with a leading side 9f1 that is along a back end section of main pole, and tapered side 9c2 connects trailing edge 9t with a trailing side 9f2 that is opposite side 9f1 along the back end section which terminates at a back end 9v. According to one embodiment, leading shield 42, first trailing shield section 40a, and second trailing shield section 43 all extend a distance r from the ABS 50-50 in a z-axis direction toward a back end of the PMR writer. However, the present invention also anticipates that the leading shield may extend a lesser or greater distance than r from the ABS. Furthermore, write gap 45 has a uniform thickness in a down-track (y-axis) direction and leading gap 47 has a uniform thickness along the y-axis direction. As a result, first trailing shield section 40a has a side 40a2 adjoining write gap 45 and an opposite side 40a4 formed essentially parallel to tapered side 9c2. First trailing shield section has a third side 40a1 formed along the ABS, and a fourth side 40a3 facing away from the ABS and coplanar with a side of second trailing shield section 43.

As mentioned previously, the c-axis 46 is pointing toward the main pole 9 and has an angle α between 0 and 60 degrees, and preferably 20 to 45 degrees with respect to the ABS 50-50. The c-axis is also the hard axis direction for crystals within the anisotropic (-Ku) magnetic layer that forms first trailing shield section 40a which may be comprised of hcp-CoIr wherein the Ir content is from 10 to 40 atomic %, and preferably between 17 and 22 atomic %, dhcp-CoFe, a'-Fe—C, or NiAs-type $Mn_{50}Sb_{50}$.

Figure 6:
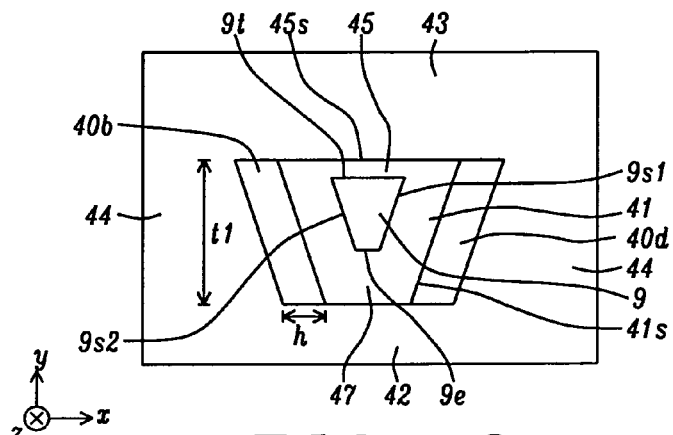
FIG. 6 is an ABS view of an anisotropic (-Ku) magnetic shield formed between a side gap and side shield on each side of the main pole according to a third embodiment of the present invention.

Referring to FIG. 6, a third embodiment of the present invention is shown that retains all the features of the second embodiment except the anisotropic (-Ku) shield layer is employed on either side of main pole 9 as first side shield sections 40b, 40d rather than as a single layer between write gap 45 and trailing shield 43. In this case, the trailing shield structure is entirely comprised of an isotropic magnetic layer 43 and adjoins a top surface of first side shield sections 40b, 40d as well as a top surface of second side shield sections 44 along a plane (not shown) that is coplanar with a top surface 45s of write gap 45. First side shield sections have a width h of 50 to 500 nm in a cross-track direction. Thus, the side shields are a composite with first side shield sections 40b, 40d adjacent to a side gap 41 along a side that is parallel to a main pole side 9s1 or 9s2, and second side shield sections 44 made of an isotropic magnetic material that adjoin a side of each first side shield section which faces away from the main pole.

According to one embodiment, the first side shield sections 40b, 40d extend a distance t1 in a down track direction which is equivalent to the combined thickness of write gap 45, side gap 41, and lead gap 47. Alternatively, the first side shield sections may have a thickness along the y-axis that is less than t1 but is preferably greater than the main pole thickness (distance between trailing edge 9t and leading edge 9e). Since flux loss from the main pole to a second side shield section 44 is substantially reduced because of first side shield sections 40b, 40d, the side gap width may be less than in prior art shield designs thereby enabling a higher TPI than previously realized. As noted previously, side gap 41 may have a uniform width and conform to main pole sides 9s1, 9s2. Thus, the side of each first side shield section 40b, 40d that adjoins the side gap may be parallel to the nearest main pole side 9s2, 9s1, respectively. Note that this embodiment also encompasses a composite structure wherein a non-magnetic metal layer is formed between first and second side shield sections as described later with regard to FIG. 12. Furthermore, there is preferably a Ru seed layer (not shown) between each side gap 41 and first side shield sections 40b, 40d to help align the hard axis (c-axis direction) of each anisotropic (-Ku) magnetic layer toward the main pole 9.

Figure 7A:
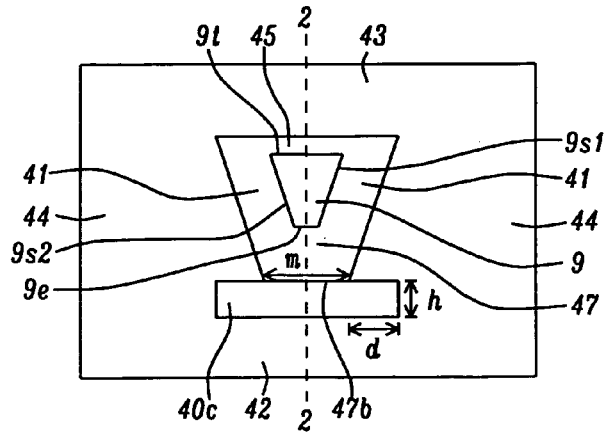
FIG. 7a is an ABS view of an anisotropic (-Ku) magnetic shield layer formed between a lead gap and a second section of leading shield according to a fourth embodiment of the present invention.

Referring to FIG. 7a, a fourth embodiment is depicted that retains all the features of the second embodiment except an anisotropic (-Ku) magnetic layer 40c is formed between a leading shield 42 and leading gap 47 rather than between write gap 45 and trailing shield 43. Therefore, the leading shield is considered to be a composite having a first leading shield section 40c formed adjacent to a bottom surface 47b of lead gap 47 and a second leading shield section 42 which adjoins a side of the first leading shield section that faces away from main pole 9. Optionally, a non-magnetic metal layer such as Ru may be formed between first and second leading shield sections (FIG. 15), and a Ru seed layer may be formed between first leading shield section 40c and lead gap 47. First leading shield section has a thickness h of 50 to 500 nm and preferably has a width greater than the width m of the bottom surface 47b of the lead gap. In one aspect, the width of the first leading shield section is (m+2d). A top surface of first leading shield section 40c interfaces with a bottom surface of side shield sections 44 along a plane (not shown) that is coplanar with bottom surface 47b. Second leading shield section 42 interfaces with side shields 44 at distances greater than (m+d) from a center plane 2-2 that bisects the main pole along the y-axis direction. According to the present invention, the first leading shield section 40c provides an advantage over existing shield designs since it prevents flux leakage from main pole 9 to second leading shield section 42 thereby allowing a thinner lead gap 47 which enables a higher BPI compared with the prior art.

Figure 7B:
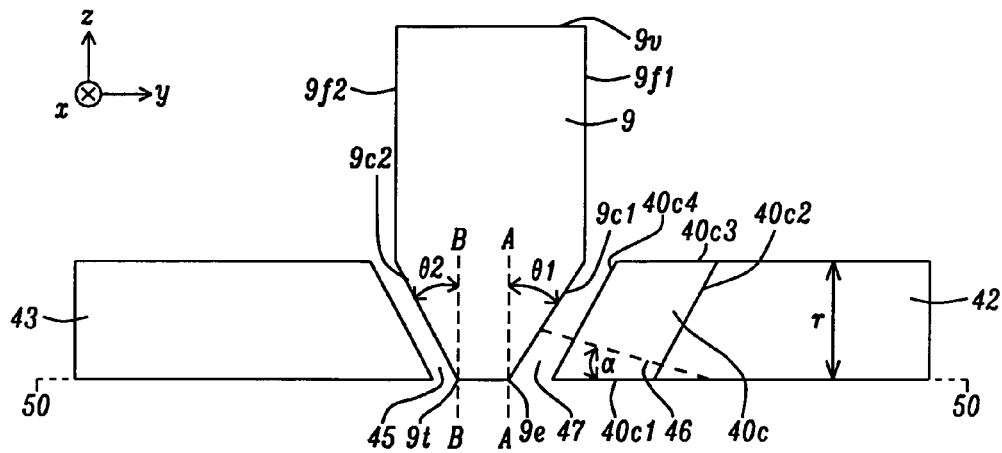
FIG. 7b is a cross-sectional view of the PMR writer shown in FIG. 7a wherein the c-axis angle for the anisotropic (-Ku) magnetic layer is shown with respect to the ABS.

In FIG. 7b, a cross-sectional view is illustrated along the plane 2-2 (FIG. 7a) and retains the same features as described earlier with respect to FIG. 5b except shield layer 40a is omitted and the anisotropic (-Ku) shield layer 40c is formed between the lead gap 47 and leading shield 42 and has a c-axis 46 pointing toward main pole tapered side 9c1 which connects leading edge 9e with leading side 9f1. The c-axis forms an angle between 0 and 60 degrees, and preferably 20 to 45 degrees with respect to the ABS 50-50. First leading shield section 40c has a first side 40c1 formed along the ABS, a second side 40c2 interfacing with the second leading shield section, a third side 40c3 formed parallel to the ABS and a distance r therefrom, and a fourth side 40c4 that adjoins leading gap 47 and is parallel to main pole tapered side 9c1.

Figure 8:
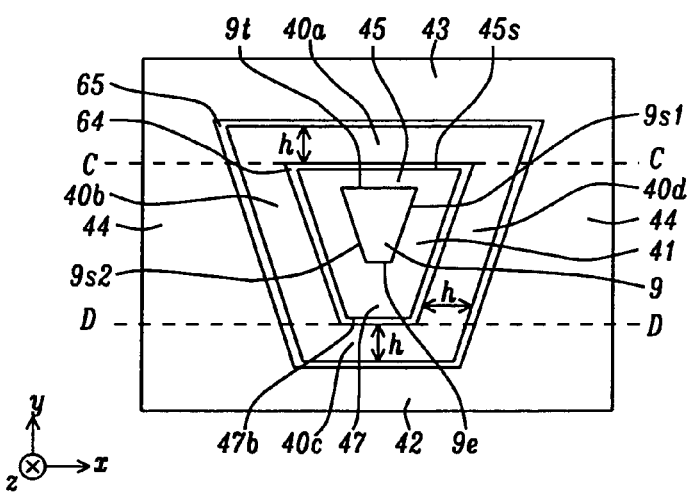
FIG. 8 is an ABS view of an all wrap around shield structure comprised of an anisotropic (-Ku) magnetic layer adjoining the gap layer on each main pole side and an isotropic magnetic layer formed on a side of each section of anisotropic layer that faces away from the main pole according to a fifth embodiment of the present invention.

Referring to FIG. 8, a fifth embodiment is depicted which combines the features of the second, third, and fourth embodiments to provide an AWA shield wherein there is a contiguous anisotropic (-Ku) magnetic layer comprised of first shield sections 40a-40d around the main pole 9 at the ABS. Furthermore, there is an isotropic magnetic layer (second shield section) formed adjacent to a side of each first shield section that faces away from the main pole. In particular, first trailing shield section 40a connects with first side shield sections 40b, 40d along a plane C-C that is proximate to write gap surface 45s, and first leading shield section 40d connects with the first side shield sections along a plane D-D that is proximate to lead gap bottom surface 47b. In one aspect, first side shield sections 40a-40d have a uniform width (or thickness) h that is between 50 and 500 nm. However, the present invention anticipates that one or both of the thicknesses for anisotropic (-Ku) magnetic layers 40a, 40c may be different than the width for first side shield sections 40b, 40d. Moreover, each of the first shield sections is preferably formed on a Ru seed layer 64 and has a c-axis pointing toward the main pole. As indicated earlier, when an anisotropic (-Ku) material is selected for the first shield sections 40a-40d, the hard axis within each of the anisotropic (-Ku) magnetic layers aligns with the c-axis and thereby prevents or substantially minimizes any flux leakage from the main pole in a direction parallel to the ABS. Therefore, the flux field of the main pole 9 at the ABS is maximized to improve writability. In addition, the gap layer surrounding the main pole may be reduced in width and thickness thereby allowing a simultaneous increase in BPI and TPI for this embodiment.

The fifth embodiment also anticipates that a non-magnetic metal layer 65 made of Ru, for example, may be formed between each first shield section and an adjacent second shield section to prevent interlayer coupling between first and second shield sections. Thus, the non-magnetic metal layer 65 forms a contiguous layer and separates first trailing shield section 40a from second trailing shield section 43, first side shield section 40b (and 40d) from a second side shield section 44, and first leading shield section 40c from second leading shield section 42. A method of forming the shield structure in FIG. 8 is not provided here. However, a combination of fabrication processes described with regard to FIGS. 9-16 may be employed to make the AWA shield structure where there is a contiguous anisotropic (-Ku) magnetic shield layer surrounding the main pole as appreciated by those skilled in the art.

Figure 9:
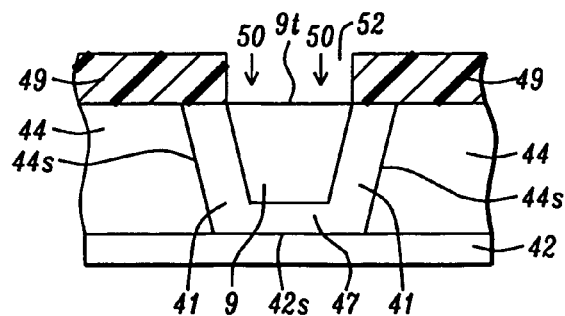
FIGS. 9-10 show intermediate steps during the fabrication of the composite trailing shield structure depicted in FIGS. 5a, 5b.

Referring to FIG. 9, an intermediate structure formed during the fabrication of a composite trailing shield according to the second embodiment (FIG. 5a) is shown. A leading shield 42 and side shield layer 44 are sequentially formed on a substrate (not shown) by a conventional plating method. Next, an opening (not shown) that is bounded by sidewalls 44s and top surface 42s is formed in the side shield layer 44 by a well known photoresist patterning and ion beam milling (IBE) sequence. A dielectric material is deposited in the opening to form lead gap 47 on a portion of top surface 42s, and to form a side gap 41 on sidewalls 44s. Thereafter, main pole 9 is plated on side gap 41 and lead gap 47 to fill the opening. Typically, a chemical mechanical polish (CMP) process is used to form a main pole top surface including trailing edge 9t that is coplanar with top surfaces of side shields 44 and side gaps 41. A photoresist layer 49 is coated on the side shields, side gaps, and main pole and then patterned to form an opening 52 that uncovers a portion of main pole top surface including leading edge 9t. An ion beam milling process that comprises ion beams 50 is employed to taper the trailing side (9f2 in FIG. 5b) and form a tapered side 9c2 having a taper angle θ2 as depicted in FIG. 5b. Note that the tapered side 9c1 connected to leading side 9f1 may be formed by a standard process after main pole deposition but prior to the patterning process that forms opening 52. Photoresist layer 49 is then removed by a conventional stripping process.

Figure 10:
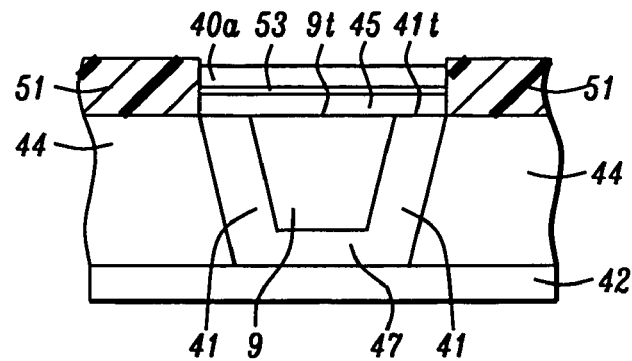

Referring to FIG. 10, a second photoresist layer 51 is coated on the side shields 44, side gap top surfaces 41t, and on the trailing side of main pole 9 to form an opening that uncovers top surfaces 41t and a portion of the main pole including trailing edge 9t. Next, a write gap layer is deposited by an atomic layer deposition (ALD) method to form a conformal write gap 45 on the tapered main pole trailing side (not shown) including trailing edge 9t, and on side gap top surfaces 41t. A seed layer 53 that is preferably Ru with a thickness from 2 to 5 nm, and the anisotropic (-Ku) trailing shield section 40a are sequentially sputtered on the write gap 45. In a preferred embodiment, the first trailing shield section is made of $Co_{83}Ir_{17}$ although CoIr with an Ir content between 10 and 40 atomic % is also acceptable. A CMP process may be used to remove layers 40a, 45, 53 above photoresist layer 51 so that a top surface of the photoresist layer is exposed to facilitate stripping.

Subsequently, the second photoresist layer 51 shown in the intermediate structure is removed by a standard process. Finally, the second trailing shield section 43 is plated on side shield sections 44 and on first trailing shield section 40a. Another CMP process may be used to form a planar top surface of second trailing shield 43 as depicted in the embodiment represented by FIG. 5a.

The present invention also encompasses an embodiment wherein a non-magnetic metal layer is formed between first and second trailing shield sections 40a, 43, respectively. As depicted in FIG. 11, photoresist layer 51 in the intermediate structure shown in FIG. 10 is removed by a standard process. Thereafter, a non-magnetic layer 59 comprised of Ru or the like with a thickness from about 20 to 50 Angstroms is conformally deposited by an ALD method on a top surface and sides of first trailing shield section 40a. Then the second trailing shield section 43 may be plated on the non-magnetic layer 59 by a conventional method. Finally, a CMP process may be employed to form a planar top surface 43s on the shield structure.

Figure 12:
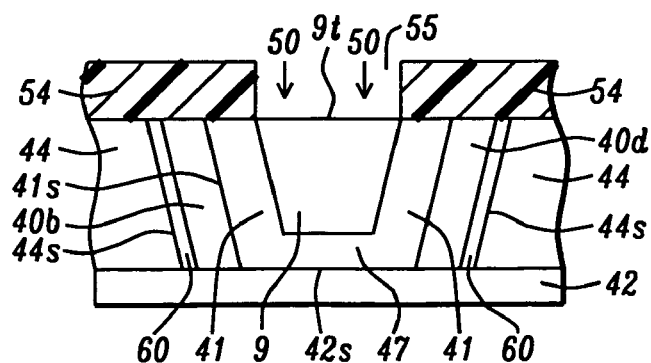
FIGS. 12-13 show intermediate steps during the fabrication of the composite side shield structure depicted in FIG. 6.

Referring to FIG. 12, an intermediate structure during the fabrication of the composite side shield described in the third embodiment (FIG. 6) is depicted. The fabrication sequence comprises forming a leading shield 42 on a substrate (not shown) and a side shield layer 44 on the leading shield. An opening that is bounded by sidewalls 44s and top leading shield surface 42s is formed by ion milling, for example. Thereafter, a thin non-magnetic metal layer 60 such as Ru that also serves as a seed layer is sputtered on the sidewalls 44s followed by sputter deposition of first side shield sections 40b, 40d on the seed layer. Then, a dielectric material is deposited by ALD to form lead gap 47 and side gaps 41.

In one embodiment, the interface of first side shield sections 40b, 40d with sidewall 41s of the side gap is essentially parallel with sidewall 44s because of the conformal nature of the gap layer deposition. The main pole 9 is then plated on the gap layers 41, 47 to fill the opening in side shield layer 44. A CMP process is typically used at this point to form a top main pole surface including trailing edge 9t that is coplanar with a top surface of second side shield sections 44 and first side shield sections 40b, 40d. Following the planarization step, a taper may be formed in the trailing main pole side (not shown) that includes trailing edge 9t by ion beam etching (IBE) which involves directing ion beams 50 at the main pole 9 through an opening 55 in photoresist layer 54. Note that the photoresist layer 54 covers and protects side gaps 41, first side shield sections 40b, 40d, and second side shield sections 44 during the IBE step.

Figure 13:
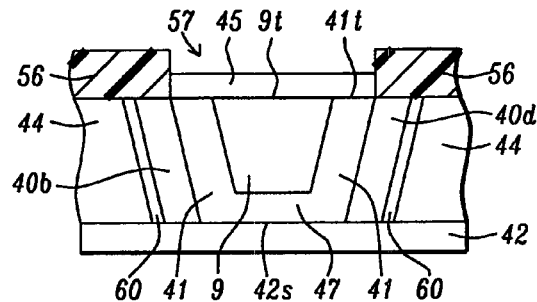

Referring to FIG. 13, photoresist layer 54 is removed by a stripping process and is replaced by a photoresist layer 56 with an opening 57 that exposes a top surface 41t of side gaps 41 and a portion of main pole 9 including trailing edge 9t. A write gap 45 made of $Al_2O_3$ or NiCr is then is then deposited by an ALD technique. At this point, photoresist layer 56 may be removed and a trailing shield 43 is plated by a conventional method to produce the composite side shield structure as described in the third embodiment.

Figure 14:
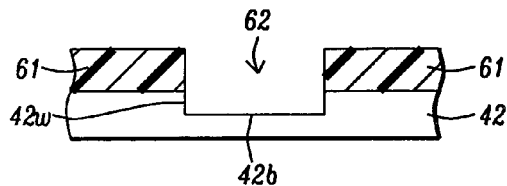
FIGS. 14-16 depict intermediate steps during the fabrication of the composite leading shield structure in FIGS. 7a, 7b.

Referring to FIG. 14, an intermediate structure during the fabrication of the composite leading shield described in the fourth embodiment (FIG. 7a) is depicted. A leading shield 42 is plated on a substrate. After a photoresist layer 61 is coated and patterned to form an opening 62 on a top surface of the leading shield, an ion beam etch may be used to extend the opening into the leading shield to generate sidewalls 42w and a trench bottom 42b.

Figure 15:
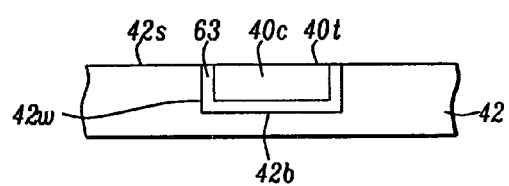

Referring to FIG. 15, a non-magnetic metal layer having a thickness from 2 to 5 nm and made of Ru, for example, which also serves as a seed layer 63 is deposited by an ALD method or the like on the sidewalls 42w and bottom 42b of the leading shield 42 within opening 62. Next, an anisotropic (-Ku) magnetic material is deposited on the seed layer to produce the first leading shield section 40c. A CMP process may be employed to form a top surface 42s of the second leading shield section 42 that is coplanar with a top surface 40t of the first leading shield section.

Figure 16:
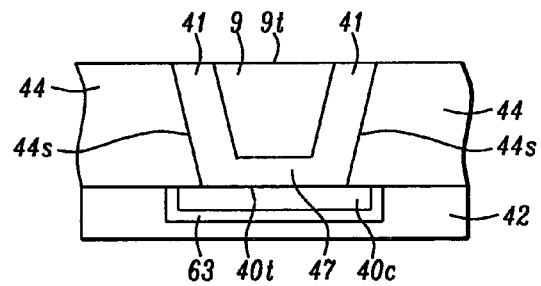

Referring to FIG. 16, a side shield layer 44 is plated on first and second leading shield sections 40c, 42, respectively. An opening that is bounded by sidewalls 44s and first leading shield surface 40t is formed by ion milling, for example, through a photoresist mask layer (not shown). Thereafter, a dielectric material is deposited by ALD to form a conformal lead gap 47 and side gaps 41 on top surface 40t and sidewalls 44s, respectively. The main pole 9 is then plated on the gap layers 41, 47 to fill the opening in side shield layer 44. A CMP process is typically used at this point to form a top main pole surface including trailing edge 9t that is coplanar with a top surface of second side shield sections 44 and side gaps 41. Next, a conventional write gap 45 is formed on the main pole 9 and side gaps 41 as described previously and then a trailing shield 43 is plated on the write gap and side shields 44.

Figure 17:
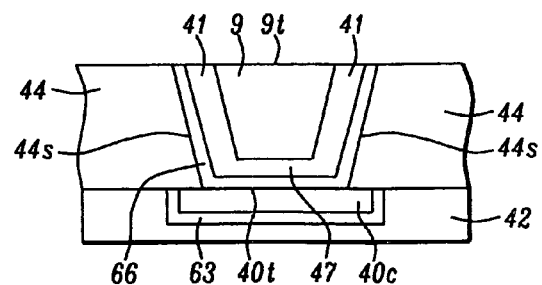
FIG. 17 is a cross-sectional view showing a Ru seed layer between a lead gap and a first leading shield section according to an embodiment of the present invention.

In an alternative embodiment depicted in FIG. 17, a Ru seed layer 66 is deposited by ALD on top surface 40t and sidewalls 44s prior to depositing a dielectric material that forms lead gap 47 and side gaps 41. Thereafter, the process previously described with respect to FIG. 16 is followed to form a main pole, write gap, and trailing shield structure (not shown). The seed layer 66 is used to induce a c-axis (not shown) within the adjoining first shield section 40c that is aligned toward a subsequently deposited main pole.

The advantages of the present invention are that flux leakage from a main pole to a shield structure is significantly reduced compared with prior art shield designs such that one or both of BPI and TPI is improved to enable higher performance in advanced PMR writer designs.

While this invention has been particularly shown and described with reference to, the preferred embodiment thereof, it will be understood by those skilled in the art that various changes in form and details may be made without departing from the spirit and scope of this invention.

We claim:

1. A perpendicular magnetic recording (PMR) writer, comprising:
   (a) a main pole comprised of a trailing side and a leading side with respect to a down-track direction, and two sides connecting said leading and trailing sides; said leading side has a leading edge at an air bearing surface (ABS) and said trailing side has a trailing edge at the ABS;
   (b) a gap layer adjacent to and surrounding the main pole at the ABS wherein said gap layer includes a write gap along the trailing side and trailing edge, a lead gap along the leading side and leading edge, and a side gap along each of the sides of the main pole;
   (c) a first shield section formed adjacent to at least one of the write gap, side gaps, and lead gap, said first shield section is comprised of an anisotropic (-Ku) magnetic material with a hard axis in a direction toward the main pole and a magnetization that is induced in a direction orthogonal to the hard axis with a weak magnetic field; and
   (d) an isotropic magnetic shield formed adjacent to each first shield section on a side thereof facing away from the main pole, and contacting portions of the gap layer that are not adjacent to a first shield section.

2. The PMR writer of claim 1 wherein the at least one first shield section has a thickness between about 50 and 500 nm.

3. The PMR writer of claim 2 wherein the at least one first shield section is made of hcp-CoIr wherein the Ir content is between about 10 and 40 atomic %, dhcp-CoFe, a'-Fe—C, or NiAs-type $Mn_{50}Sb_{50}$.

4. The PMR writer of claim 3 wherein the at least one first shield section has a c-axis in the hard axis direction and formed with an angle between 0 and about 60 degrees with respect to the ABS.

5. The PMR writer of claim 1 further comprised of a non-magnetic layer made of Ru formed between the at least one first shield section and an adjacent isotropic magnetic shield.

6. The PMR writer of claim 1 wherein a first shield section is formed between the write gap and a trailing shield section made of an isotropic magnetic layer.

7. The PMR writer of claim 6 wherein the first shield section has a width that is greater than a width of the write gap in a cross-track direction.

8. The PMR writer of claim 1 wherein a first shield section is formed between each side gap and a side shield made of an isotropic magnetic layer.

9. The PMR writer of claim 8 wherein each first shield section extends a distance in a down-track direction that is greater than a thickness of the main pole at the ABS.

10. The PMR writer of claim 1 wherein a first shield section is formed between the leading gap and a leading shield section made of an isotopic magnetic layer.

11. A PMR writer, comprising:
   (a) a main pole comprised of a trailing side and a leading side with respect to a down-track direction, and two sides connecting said leading and trailing sides; said leading side has a leading edge at an air bearing surface (ABS) and said trailing side has a trailing edge at the ABS;
   (b) a gap layer formed adjacent to and surrounding the main pole at the ABS wherein said gap layer includes a write gap along the trailing side and trailing edge, a lead gap along the leading side and leading edge, and a side gap along each of the sides of the main pole;
   (c) a continuous first shield structure formed adjacent to said gap layer, said first shield structure has a plurality of sections each comprised of an anisotropic (-Ku) magnetic material with a hard axis in a direction toward the main pole and a magnetization that is induced in a direction orthogonal to the hard axis with a weak magnetic field;
   (d) a seed layer separating the gap layer and the first shield structure, said seed layer induces the hard axis direction in the first shield structure toward the main pole;
   (e) a continuous second shield structure made of an isotropic magnetic material and formed adjacent to the continuous first shield structure, said continuous second shield has a trailing section formed adjacent to a first trailing shield section, a leading section formed adjacent to a first leading shield section, and two side sections wherein each side section is formed adjacent to a nearest first side shield section, and each second shield section is formed along a side of a first shield section that faces away from the main pole; and
   (f) a non-magnetic layer formed between the continuous first shield structure and the continuous second shield structure.

12. The PMR writer of claim 11 wherein the first leading shield section and first trailing shield section have a thickness in a down-track direction between about 50 and 500 nm, and the first side shield sections have a width in a cross-track direction from about 50 to 500 nm.

13. The PMR writer of claim 11 wherein each of the first trailing shield section, first leading shield section, and first side shield sections has a hard axis in a direction toward the main pole, and a c-axis aligned in the hard axis direction with an angle from 0 to about 60 degrees with respect to the ABS.

14. The PMR writer of claim 11 wherein each first shield section is made of hcp-CoIr wherein the Ir content is between about 10 and 40 atomic %, dhcp-CoFe, a'-Fe—C, or NiAs-type $Mn_{50}Sb_{50}$.

15. The PMR writer of claim 11 wherein the seed layer and the non-magnetic layer are comprised of Ru.

16. A method of fabricating a PMR writer having a composite trailing shield at an air bearing surface (ABS), comprising:

(a) sequentially forming a leading shield layer and a side shield layer on a substrate, said side shield layer has an opening formed therein which is bounded by side shield sidewalls and a top surface of said leading shield layer;

(b) depositing a side gap along said side shield sidewalls and a leading gap on the top surface of the leading shield layer;

(c) plating a main pole layer on the side gap and leading gap to fill the opening in the side shield layer, and planarizing a top surface of the main pole to be coplanar with said shield layer;

(d) depositing a write gap on the side gap and on the main pole top surface;

(e) sequentially forming a seed layer and an anisotropic (-Ku) magnetic layer on the write gap, said anisotropic (-Ku) magnetic layer forms a first section of trailing shield;

(f) forming a non-magnetic layer on the anisotropic (-Ku) magnetic layer; and (g) plating a second section of trailing shield comprised of an isotropic magnetic layer on the non-magnetic layer and on portions of the side shield layer.

17. The method of claim 16 wherein the first trailing shield section has a thickness from 50 to 500 nm and is made of hcp-CoIr wherein the Ir content is between about 10 and 40 atomic %, dhcp-CoFe, a'-Fe—C, or NiAs-type $Mn_{50}Sb_{50}$.

18. The method of claim 16 wherein the seed layer and the non-magnetic metal layer are comprised of Ru.

19. A method of fabricating a PMR writer having a composite side shield structure at an air bearing surface (ABS), comprising:

(a) sequentially forming a leading shield layer and a side shield layer made of an isotropic soft magnetic layer on a substrate, said side shield layer has an opening formed therein which is bounded by side shield sidewalls and a top surface of said leading shield layer;

(b) depositing a non-magnetic metal layer on the side shield sidewalls;

(c) conformally depositing an anisotropic (-Ku) magnetic layer on the non-magnetic metal layer on each sidewall, said anisotropic (-Ku) magnetic layer forms a first shield section, and the isotropic magnetic layer is a second side shield section that together with the first side shield section form a composite side shield structure;

(d) depositing a conformal side gap on the first side shield sections, and a leading gap on the top surface of the leading shield layer;

(e) plating a main pole layer on the side gap and leading gap to fill the opening in the side shield layer, and planarizing a top surface of the main pole to be coplanar with said composite side shield structure;

(f) depositing a write gap on the side gap and on the main pole top surface; and (g) plating a trailing shield on the write gap and on portions of the composite side shield structure.

20. The method of claim 19 wherein each first side shield section has a width in a cross-track direction from about 50 to 500 nm and is made of hcp-CoIr wherein the Ir content is between about 10 and 40 atomic %, dhcp-CoFe, a'-Fe—C, or NiAs-type $Mn_{50}Sb_{50}$.

21. The method of claim 19 wherein each first side shield section has a thickness in a down-track direction that is greater than a thickness of the main pole at the ABS.

22. A method of fabricating a PMR writer having a composite leading shield structure at an air bearing surface (ABS), comprising:

(a) forming a leading shield layer made of an isotropic soft magnetic material on a substrate, said leading shield layer has an opening formed therein which is bounded by sidewalls and a bottom surface within said leading shield layer;

(b) conformally depositing a non-magnetic metal layer on said sidewalls and bottom surface;

(c) depositing an anisotropic (-Ku) magnetic layer on the non-magnetic metal layer to fill said opening, said anisotropic (-Ku) magnetic layer forms a first leading shield section, and the isotropic magnetic layer is a second leading shield section that together with the first leading shield section forms a composite leading shield structure;

(d) forming a side shield layer made of an isotropic magnetic material on the composite leading shield structure, said side shield layer has an opening formed therein bounded by sidewalls and a top surface of said first leading shield section;

(e) depositing a conformal side gap on the side shield sidewalls, and a leading gap on the top surface of the first leading shield section;

(f) plating a main pole layer on the side gap and leading gap to fill the opening in the side shield layer, and planarizing a top surface of the main pole to be coplanar with said side shield layer;

(g) depositing a write gap on the side gap and on the main pole top surface; and (h) plating a trailing shield on the write gap and on portions of the side shield layer.

23. The method of claim 22 wherein the first leading shield section has a thickness from 50 to 500 nm and is made of hcp-CoIr wherein the Ir content is between about 10 and 40 atomic %, dhcp-CoFe, a'-Fe—C, or NiAs-type $Mn_{50}Sb_{50}$.

24. The method of claim 22 wherein the non-magnetic metal layer is Ru with a thickness between about 2 and 5 nm.

* * * * *